US011647275B2

(12) United States Patent
Irlbacher et al.

(10) Patent No.: US 11,647,275 B2
(45) Date of Patent: May 9, 2023

(54) CARD-MARKING SYSTEM AND METHOD FOR THE AUTOMATED DETECTION OF AN OPTIMIZED SETTING OF A CARD-MARKING SYSTEM

(71) Applicant: Mühlbauer GmbH & Co. KG, Roding (DE)

(72) Inventors: Benedikt Irlbacher, Neunburg (DE); Tu Nguyen, Munich (DE); Robert Stark, Markneukirchen (DE)

(73) Assignee: Mühlbauer GmbH & Co. KG, Roding (DE)

( * ) Notice: Subject to any disclaimer, the term of this patent is extended or adjusted under 35 U.S.C. 154(b) by 107 days.

(21) Appl. No.: 17/251,275

(22) PCT Filed: Jun. 6, 2019

(86) PCT No.: PCT/EP2019/064905
§ 371 (c)(1),
(2) Date: Dec. 11, 2020

(87) PCT Pub. No.: WO2019/238546
PCT Pub. Date: Dec. 19, 2019

(65) Prior Publication Data
US 2021/0266454 A1 Aug. 26, 2021

(30) Foreign Application Priority Data
Jun. 11, 2018 (DE) .................... 10 2018 113 913.6

(51) Int. Cl.
*H04N 5/232* (2006.01)
*G05B 19/4155* (2006.01)
(Continued)

(52) U.S. Cl.
CPC ......... *H04N 23/62* (2023.01); *G05B 19/4155* (2013.01); *G06K 1/126* (2013.01);
(Continued)

(58) Field of Classification Search
CPC ........... H04N 5/23216; G05B 19/4155; G05B 2219/36104; G06K 1/126; G06T 7/0004; G06T 2207/30108
See application file for complete search history.

(56) References Cited

U.S. PATENT DOCUMENTS

| 2004/0031779 | A1* | 2/2004 | Cahill | ................ | B23K 26/0853 257/E23.179 |
| 2005/0109959 | A1* | 5/2005 | Wasserman | .......... | H04N 5/2256 250/559.19 |

(Continued)

FOREIGN PATENT DOCUMENTS

| DE | 102008025776 A1 | 12/2009 |
| DE | 102009023288 A1 | 12/2010 |

OTHER PUBLICATIONS

English Translation of Japanese Publication No. JP 2006079572 A (Year: 2004).*

(Continued)

*Primary Examiner* — Francis Geroleo
(74) *Attorney, Agent, or Firm* — Wood Herron & Evans LLP (57) ABSTRACT

A card-marking system is provided for personalizing plastic cards such as chip cards or identity cards by laser marking. A corresponding method for automated detection of an optimized setting includes a vision sub-system setting process for setting a vision sub-system of the card marking system and a subsequent marking sub-system setting process for setting a marking sub-system of the card-marking system. The card-marking system is designed to carry out the above method fully or semi-automatedly and to this end can include a corresponding computer program controlling the method.

18 Claims, 8 Drawing Sheets

(51) Int. Cl.
*G06K 1/12* (2006.01)
*G06T 7/00* (2017.01)
*H04N 23/62* (2023.01)

(52) U.S. Cl.
CPC .. *G06T 7/0004* (2013.01); *G05B 2219/36104* (2013.01); *G06T 2207/30108* (2013.01)

(56) References Cited

U.S. PATENT DOCUMENTS

| | | | |
|---|---|---|---|
| 2007/0086822 A1* | 4/2007 | Sato | B23K 26/0648 400/129 |
| 2008/0316504 A1* | 12/2008 | Nemets | B23K 26/042 257/E23.179 |
| 2010/0292947 A1 | 11/2010 | Buk | |

OTHER PUBLICATIONS

English Translation of German Application No. DE 102008025776 A1 (Year: 2008).*
German Patent Office, Office Action issued in German Application No. 10 218 113913.6 dated Apr. 29, 2019 (8 pages).
International Searching Authority, Preliminary Report on Patentability issued in International Application No. PCT/EP2019/064905 dated May 28, 2020 (10 pages).
International Searching Authority, Search Report and Written Opinion issued in International Application No. PCT/EP2019/064905 dated Feb. 19, 2020 (15 pages).
International Searching Authority, Corrected Search Report issued in International Application No. PCT/EP2019/064905 dated Feb. 21, 2020 (2 pages).
International Searching Authority, International Preliminary Report on Patentability issued in International Application No. PCT/EP2019/064905 dated May 28, 2020 (7 pages).

* cited by examiner

CARD-MARKING SYSTEM AND METHOD FOR THE AUTOMATED DETECTION OF AN OPTIMIZED SETTING OF A CARD-MARKING SYSTEM

CROSS-REFERENCE TO RELATED APPLICATIONS

This application is a national phase entry of, and claims priority to, International Application No. PCT/EP2019/064905, filed Jun. 6, 2019, which claims priority to German Patent Application No. DE 10 2018 113 913.6, filed Jun. 11, 2018, both with the same title as listed above. The above-mentioned patent applications are incorporated herein by reference in their entireties.

TECHNICAL FIELD

This application relates to a card marking system, e.g., for the personalization of plastic cards—such as chip cards or identity cards for example—by laser marking, as well as an associated method.

BACKGROUND

A large number of different types of personalized cards are known from the state of the art. For example, in the sense of the invention, identity cards, in particular also data pages for identity documents such as passports, and many types of chip cards, such as bank cards, credit cards, identity cards, membership cards, access authorization cards, etc. belong to the group of personalized cards. Here, the term "personalization" or "personalized" means that the respective cards contain or carry information which is typically associated with a card holder. In this way, in some cases, the information may for example identify the holder, for example by their name, an identity number, or other features that may for example be printed on the card, otherwise applied to the card or stored on the card. The personalization can, in particular, be related to a single person individually, or however also to a specific limited group of people, for example employees of a company. In many cases, the personalized cards are plastic cards, i.e., they contain a predominant proportion of plastics material, and often they substantially consist of it. For example, cards made of a laminate containing plastics material, to which personalization information is applied or incorporated therein, are widely used. Personalized cards made of paper or cardboard or mixed materials containing paper are also known. In this context, the application of the personalization information can be carried out, for example, by printing or by engraving or a targeted local change in color of the surface material by the application of energy, in particular by a suitable laser.

Known card marking systems for the personalization of cards often comprise a marking subsystem for generating a marking on a card to be marked, as well as an associated vision subsystem in order to visually inspect the card before, during or after marking. As a rule, the vision system comprises a camera for this purpose. The inspection can be used for quality control of the marking process, as well as for manual adjustment of individual components of the card marking system, in particular for adjustment of the vision subsystem and the marking subsystem relative to each other.

With known systems, the entire adjustment and relative alignment of the vision subsystem and the marking subsystem, for example when the system is used for the first time or after it has been serviced or after components have been replaced, must be carried out entirely manually, which is very time consuming and prone to errors. Also, during the course of this, in most cases, a large number of cards are consumed which need to be used for iterative personalization processes on a test basis, whereby on the basis of the results of these tests conclusions are drawn regarding a change, to be carried out manually, of the settings for the next iteration, until, usually after many iterations, a sufficiently accurate setting is achieved.

It would therefore be desirable to improve the adjustment of such a card marking system, in particular with regard to a reduction of the demands placed on a user and necessary for this purpose, the time required, the usage of cards required for this purpose and/or so as to avoid adjustment errors.

SUMMARY

To address these and other problems with the conventional systems and designs, a method is provided in one embodiment for automatically determining an optimized setting of a card marking system, in particular of a card marking system for the personalization of plastic cards by laser marking, wherein the card marking system comprises a marking subsystem for marking a card, as well as a vision subsystem for inspecting the card. The method comprises: (a) a vision subsystem setting process for automatically determining an optimized target setting of the vision subsystem, comprising: (a1) inspecting a reference element, in particular a reference card with a reference marking, by the vision subsystem and generating an inspection result, wherein the vision subsystem has a currently set actual setting, which can be a defined default setting; and (a2) determining a target setting of the vision subsystem in dependence upon a comparison of the inspection result with a reference inspection criterion in such a way that the target setting defines a target setting of the vision subsystem for a subsequent operative marking mode of operation of the card marking system, which target setting of the vision subsystem, with respect to the reference inspection criterion, is optimized relative to the actual setting; and (b) a subsequent marking subsystem setting process for automatically determining an optimized target setting of the marking subsystem, comprising: (b1) marking a card by the marking subsystem so as to form a predetermined reference marking, wherein the marking subsystem is currently set to an actual setting; (b2) inspecting the marked card by the vision subsystem set according to its target setting which has been determined in the vision subsystem setting process so as to generate a card inspection result; and (b3) determining a target setting of the marking subsystem in dependence upon a comparison of the card inspection result with a predetermined marking inspection criterion so that the target setting of the marking subsystem defines a target setting of the marking subsystem which, relative to the actual setting, is optimized with respect to the at least one marking inspection criterion, for a subsequent operative marking mode of operation of the card marking system.

In the sense of the invention, the expression "setting" is intended to be understood to mean "adjustment" and/or "calibration". In this context, the expression "adjustment" is to be understood to mean a setting or tuning of a measuring device in order to eliminate systematic deviations to such an extent as is required for the intended application. Accordingly, adjustment requires an intervention which permanently changes the measuring device. In contrast to this, the expression "calibration" is to be understood to mean a measuring action in which no intervention in the measuring device is carried out, but rather a measuring process for the determination, in a reliably reproducible manner, of the deviation of a measuring device in relation to another device or another reference, which in this case are also called "normal". A calibration requires a second step, i.e., the taking into account of the determined deviation during the subsequent use of the measuring device for the correction, for example the mathematical correction, of the measured values obtained.

The expression "automatically determining" of an "optimized" setting of a system is intended to be understood to mean a process which is carried out at least partially automatically, in particular by the system which is to be set, itself, and in which values for one or more adjustable parameters of the system are determined on the basis of a measurement in such a way that, if the parameters are set to the values determined, a setting of the system is obtained which is improved when compared with the initial state of the system on which the measurement is based and with respect to at least one predetermined evaluation criterion (here: reference inspection criterion or marking inspection criterion). In this regard, the improved setting does not necessarily have to represent an absolute optimum of all possible settings.

The expression "vision subsystem" is intended to be understood to mean a subsystem of the card marking system which comprises at least one component of the system, which component is provided for the visual inspection of a card or of a reference element, in particular a reference element which is also card-shaped, whereby such a component may include an image acquisition device, such as for example a camera.

In a corresponding manner, the expression "marking subsystem" is intended to be understood to mean a subsystem of the card marking system which comprises at least one component of the system intended for marking a card, whereby such a component may include a marking laser and/or a printing device.

The method can therefore run automatically, at least portions of it, preferably even all of it, which can have a number of advantages over previous manual setting methods. In particular, this may include one or more of the following, or even all of the following: a saving of time, a higher setting accuracy, a repeatability with the same setting accuracy and which is independent of the operator, the avoidance of setting errors, in particular of setting errors that are difficult to detect, a simplified operation, which, depending on how the method is run, may even be reduced to a mere activation and subsequent deactivation of the setting process, a reinstatement after a loss (e.g., after defects) or changes of the settings which have occurred in the meantime, as well as a transferability, of the settings which have been found, to other card marking systems of the same or at least a substantially comparable type. In particular, the method not only enables an optimized adjustment of each subsystem on its own to be achieved, but also a setting, in particular an adjustment and/or calibration, of the marking subsystem relative to the vision subsystem, so that this alignment can be carried out with the advantages mentioned above.

In the following, preferred embodiments of the method will be described, each of which, as far as this is not expressly excluded or technically impossible, can be combined in any desired manner with one another, as well as with the other embodiments of the invention which are described herein.

In some embodiments, for at least one operating parameter of the vision subsystem, which at least one operating parameter at least partly determines one or more of the following, a corresponding target setting is determined according to the vision subsystem setting process: (i) a spatial pose of a card holder for a card to be inspected, relative to an image acquisition device of the vision subsystem; (ii) an optical magnification of the vision subsystem; (iii) an optical focus of the vision subsystem; (iv) the pose of an optical axis of the vision subsystem; (v) a setting, in particular an illumination setting, of a source of radiation, in particular a light source, of the vision subsystem provided for irradiating a card during its inspection by the vision subsystem; (vi) a distortion calibration for compensating any image distortions which may occur during the inspection of a card by the vision subsystem; (vii) a white balance and/or black balance of the vision subsystem. All of these operating parameters have in common that their setting can have an influence on an inspection result obtained during the inspection of the reference element, as well as subsequently during the operative marking mode of operation of a card to be marked, so that, at least in general, an optimization of their adjustment by setting them to the respective target setting which has been determined is accompanied by an optimization of the inspection result.

In the sense of the invention, the expression "spatial pose" or, in short, "pose" of an object is intended to be understood to mean a spatial position and/or a spatial orientation of the object. The spatial pose can thus be defined by up to six degrees of freedom (three for the position as well as three for the orientation), whereby not necessarily all of these degrees of freedom have to be provided by the card marking system. For example, a card holder which defines a spatial pose of a card to be inspected or of a reference element to be inspected, could be mounted in such a way that it can be rotated around a single axis only, so that at least the two further degrees of freedom for orientation are then no longer of any significance.

In some of the embodiments mentioned above, the automated determination of an optimized target setting of the at least one operating parameter of the vision subsystem is carried out without taking into account a distortion calibration to compensate for any image distortion which may occur during the inspection of a card by the vision subsystem, if the operating parameter at least partly determines one or more of the following: a spatial pose of a card holder for a card to be inspected, relative to an image acquisition device of the vision subsystem, an optical magnification of the vision subsystem, an optical focus of the vision subsystem, or the pose of an optical axis of the vision subsystem. In this way, the automated determination of respective optimized target settings for these operating parameters, mentioned above, of the vision subsystem can be carried out selectively and without taking into account a distortion calibration, which, for these parameters could possibly distort the measurement results in an unfavorable way.

In some embodiments, the card marking system comprises a card holder for receiving the reference element or a card to be marked, which card holder can be moved and/or oriented in a parameterized manner, and according to the vision subsystem setting process, for at least one operating parameter of the vision subsystem, which at least one operating parameter at least partly determines an inspection pose of the card holder relative to an image acquisition device of the vision subsystem, which inspection pose can be attained by moving and/or orienting the card holder, a corresponding target setting is determined. In this way, an inspection pose which is defined by the pose of the card holder and which is optimized according to the vision subsystem setting process is at least partly determined, in which inspection pose the reference element is arranged during the vision subsystem setting process, as well as the respective card to be marked in the subsequent operative marking mode of operation.

In some embodiments, the vision subsystem setting process comprises the following subprocesses, in particular in the order stated: (i) determining and putting into effect an optimized target setting of at least one operating parameter of the vision subsystem, which at least one operating parameter at least partly determines a spatial pose, in particular a spatial orientation, of the card holder relative to the vision subsystem; (ii) determining and putting into effect an optimized target setting of at least one operating parameter of the vision subsystem, which at least one operating parameter at least partly determines an optical focus of the vision subsystem; and (iii) determining and putting into effect an optimized target setting: (iii-1) of at least one operating parameter of the vision subsystem which at least one operating parameter at least partly determines a distortion calibration for the compensation of any image distortions which may occur during the inspection by the vision subsystem, and/or (iii-2) of at least one operating parameter of the vision subsystem, which at least one operating parameter at least partly determines a white balance and/or a black balance of the vision subsystem. These embodiments represent particularly advantageous process sequences with regard to the selection and also with regard to the order of sequence of the individual subprocesses as regards their relevance to the quality of the resulting adjustment optimization and the time required for this.

In particular, in some of these embodiments, the vision subsystem setting process comprises the following subprocesses in the order stated: (i) determining an optimized target setting of at least one operating parameter of the vision subsystem, which at least one operating parameter at least partly determines a spatial pose, in particular a spatial orientation, of the card holder relative to the vision subsystem; (ii) determining an optimized target setting of at least one operating parameter of the vision subsystem, which at least one operating parameter at least partly determines an optical focus of the vision subsystem; and (iii) again determining an optimized target setting of the at least one operating parameter of the vision subsystem, which at least one operating parameter at least partly determines a spatial orientation of the card holder relative to the vision subsystem. These embodiments represent optimized process sequences with respect to the selection and also with respect to the order of sequence of the individual subprocesses, and they are characterized by the fact that, caused by the subsequent subprocess for the optimization of the focus setting, possible undesired changes of a target setting, which target setting concerns the spatial orientation of the card holder and which has already been put into effect, are corrected again afterwards, so that, in total, with only a small number of subprocesses, this results in an optimized target setting of the set of the operating parameters involved, in particular with respect to the quality of the results, and thus a correspondingly optimized setting of the inspection pose of the card holder.

In some embodiments, the vision subsystem setting process takes place in several stages, wherein: (i) in each of the stages, the at least one operating parameter is set to a different actual setting and an inspection of the reference element is carried out at this actual setting; and (ii) the target setting of the vision subsystem is determined in dependence upon the comparison of the inspection results which are obtained in the respective stages on the basis of the at least one predetermined inspection criterion. In particular, the comparison of the inspection results which have been determined in the respective stages can be carried out among each other using the inspection criterion as a standard of comparison, or else as a comparison of an inspection result, determined in the respective stage, with a reference which is defined by the inspection criterion itself. In particular, the vision subsystem setting process could also be carried out iteratively, whereby an inspection result which has been determined in a preceding stage is respectively taken into account in each subsequent iteration, such as for example for determining the actual setting of the subsequent stage. In this way, a simple automation of the vision subsystem setting process can be achieved, wherein the determination of a target setting can be carried out by an interpolation, extrapolation or regression, in particular a linear interpolation, linear extrapolation or linear regression, on the basis of the inspection results which have been determined in the various stages.

In some embodiments, the vision subsystem setting process further comprises the following: (i) checking the reference element, in particular a reference card with a reference marking, by the vision subsystem, on the basis of reference information, as to whether the reference element is a correct or error-free reference element according to the reference information; and (ii) triggering a predetermined error handling action if this is not the case according to the result of the check. In this way, preferably at the beginning of the vision subsystem setting process, an incorrect or faulty reference element can be detected at an early stage, and in particular it can be avoided that subsequent steps of the vision subsystem setting process lead to an incorrect determination of target settings or even a failure of the vision subsystem setting process due to the faulty reference element. The error handling action can be a notification, an interruption or a termination of the vision subsystem setting process or the automatic replacement of the reference element by a different reference element kept in stock.

In some embodiments, for at least one operating parameter of the marking subsystem, which at least one operating parameter at least partly determines one or more of the following, a corresponding target setting is determined according to the marking subsystem setting process: (i) a spatial pose of a card holder for a card to be marked, relative to a marking device of the marking subsystem; (ii) an optical magnification of the marking subsystem; (iii) an optical focus distance of the marking subsystem; (iv) the pose of an optical axis of the marking subsystem; (v) a pose calibration to compensate for any possible incorrect adjustment of the marking subsystem. All of these operating parameters of the marking subsystem have in common that they can have an influence on the quality of a marking on a card produced by the marking subsystem, so that it is expedient to achieve an optimization of the setting of these operating parameters with the aim of achieving an optimized marking function of the marking subsystem, as well as the card marking system as a whole.

The spatial pose of a card to be marked during the marking process (marking pose), as it may be defined by the card holder which is mentioned under point (i), may either differ from the spatial pose of a card to be inspected during its inspection by the vision subsystem (inspection pose), for which purpose a moving and/or orientation device (in particular a card lift) may be provided for transferring the card between the two poses in the card marking system, or, conversely, both poses may coincide. The latter may be accomplished in the case of marking by irradiation (e.g., laser marking) by respectively arranging the vision subsystem and the marking subsystem during their respective operation in such a way that both their optical axes coincide (which is made possible in particular by a corresponding method of at least one of the two subsystems), or else in such a way that a corresponding pose calibration, which can be accomplished by a corresponding mathematical relationship (in particular a distortion correction) on the vision subsystem side and/or on the marking subsystem side, is used in order at least partially to compensate for the different poses of the two optical axes.

In some embodiments, the card marking system comprises a card holder which can be moved and/or oriented in a parameterized manner, and, according to the marking subsystem setting process, for at least one operating parameter of the marking subsystem, which at least one operating parameter at least partly determines a marking pose of the card holder relative to a marking device of the marking subsystem, which marking pose can be attained by moving and/or orienting the card holder, a corresponding target setting is determined. In this way, the pose of a card to be inspected and/or to be marked can, on the one hand, easily be determined by the card holder, and on the other hand, a targeted movement/orientation of the card between a marking position and an inspection position can be achieved by moving or orienting the card holder in a correspondingly controlled manner (e.g., by a corresponding control, or by control with feedback). The card holder can be regarded as a common component of the vision subsystem and of the marking subsystem, whereby its spatial pose with respect to (i) an image acquisition device of the vision subsystem (inspection pose) and (ii) a marking device of the marking subsystem (marking pose) can each be individually optimized by a corresponding target setting.

In some embodiments, the marking subsystem setting process comprises the following subprocesses in the order stated: (i) determining and putting into effect an optimized target setting of at least one operating parameter of the vision subsystem, which at least one operating parameter at least partly determines a spatial pose of the card holder relative to a marking device of the marking subsystem, or a corresponding pose calibration or a combination of both; (ii) determining and putting into effect an optimized target setting of at least one operating parameter of the marking subsystem which at least one operating parameter at least partly determines a focus distance of the marking subsystem; and (iii) again determining and putting into effect an optimized target setting of the at least one operating parameter of the vision subsystem, which at least one operating parameter at least partly determines a spatial orientation of the card holder relative to the marking subsystem, or a corresponding pose calibration or a combination of both. The subprocess (i) can be designed as a coarse positioning and/or a coarse orienting of the card holder, by which coarse positioning and/or coarse orienting the card holder and thus, if applicable, a card located therein is brought into a pose in which the subsequent subprocess (ii) can be carried out for the one positional degree of freedom with a component along the optical axis (preferably coinciding with the latter) of the marking device of the marking subsystem, in particular with optimized result quality. The subsequent sub-process (iii) can then be designed as a subsequent fine tuning of the pose of the card holder, in particular of the position of the card holder, so that, in total, with only a small number of subprocesses, this results in an optimized target setting of the set of the operating parameters involved, in particular a target setting of the set of the operating parameters involved which is optimized with respect to the quality of the results, and thus a correspondingly optimized setting of the marking pose of the card holder.

In some embodiments, the marking subsystem setting process takes place in several stages, wherein: (i) in each of the stages: the at least one operating parameter is set to a different actual setting, a card is marked at this actual setting by the marking subsystem so as to form a predetermined reference marking, and the marked card is inspected by the vision subsystem, which has been set according to its target setting which has been determined in the vision subsystem setting process; and (ii) the target setting of the vision subsystem is determined in dependence upon the comparison of the inspection results which are obtained in the respective stages on the basis of the at least one predetermined marking inspection criterion.

In particular, the comparison of the inspection results which have been determined in the respective stages can be carried out among each other using the inspection criterion as a standard of comparison, or as a comparison of an inspection result determined in the respective stage with a reference defined by the inspection criterion itself. In particular, the marking subsystem setting process can also be carried out iteratively, whereby an inspection result which has been determined in a preceding stage is respectively taken into account in each subsequent iteration, such as for example for determining the actual setting of the subsequent stage with respect to at least one operating parameter of the marking subsystem. In this way, a simple automation of the marking subsystem setting process can be achieved, wherein the determination of a target setting can be carried out by an interpolation, extrapolation or regression, in particular a linear interpolation, linear extrapolation or linear regression, on the basis of the inspection results which have been determined in the various stages.

In some embodiments, for at least one operating parameter of the marking subsystem, which at least one operating parameter at least partly determines an optical focus distance of the marking subsystem, a corresponding target setting is determined, according to the marking subsystem setting process, with a view to being able to achieve, with this target setting, a minimization of a deviation of a predetermined geometric property of the reference marking, in particular at least one dimension or its area, from a reference quantity characterized by the marking inspection criterion. Accordingly, the optical focus distance is not determined, as is usually done in optics, in such a way that the resulting focal point must necessarily be located on the object (here: the card surface to be marked), but in such a way that the image which is generated on the card and which is an image of an optical representation used for marking, for example by a laser, has a predetermined size, in particular a predetermined target size required for the purpose of the personalization.

In some embodiments, the vision subsystem setting process, the marking subsystem setting process, or both, is or are carried out both in relation to a front face and in relation to a rear face of the reference element or, respectively, of the card to be marked. In this way, a personalization of both sides of the card is also made possible. This can be achieved by providing a separate vision subsystem and/or marking subsystem respectively for the front face and the rear face, or, alternatively, by providing a device (in particular a turning device) in order to make the front face and/or the rear face of the card accessible to the same vision subsystem and/or marking subsystem in a selective manner.

In particular, in accordance with some embodiments, the reference element or the card may, for this purpose, be rotated by the card marking system between the inspection of its front face and the inspection of its rear face, within the framework of the automated determination of an optimized setting of the at least one operating parameter, in order to make the rear face accessible as well, for inspection by the same vision subsystem, after the front face, or vice versa. In this way, the expense for separate vision subsystems and/or marking subsystems for the front face and the rear face of the cards can be avoided in a simple manner.

In some embodiments, the method further comprises a reconciliation process in order to automatically reconcile the coordinate systems which are used respectively by the vision subsystem and the marking subsystem. In particular, this reconciliation may concern one or more, and preferably all, of the following aspects of the coordinate systems: origins, scaling factors, orientation of axes and angles of inclination. In this way, even in cases in which the vision subsystem and the marking subsystem use different coordinate systems, it is possible to ensure that correction information, such as corrections in terms of position or corrections in terms of orientation, can be transferred, free of errors, from the vision subsystem to the marking subsystem and can there be taken into account in order to make a marking which, correspondingly, is correct.

In some embodiments, the target settings of operating parameters of the vision subsystem and/or of the marking subsystem which have been determined by the method are stored or output, at least partly, for reuse for a later readjustment of the card marking system or as configuration data for a corresponding data-based configuring of a further card marking system. With regard to the first application mentioned, this can advantageously be used in order to readjust the card marking system with minimum effort if a previous setting has been corrupted or lost, for example due to a defect, maintenance or a replacement of a component. With regard to the second application mentioned, this allows a quick and safe new configuration of a further, comparable card marking system without there being a need for the method in accordance with the invention itself to be performed as described above.

A second embodiment of the invention relates to a card marking system, in particular for the personalization of plastic cards by laser marking, wherein the card marking system comprises a marking subsystem for marking a card, as well as a vision subsystem for inspecting the card, and wherein it is arranged to carry out the method according to the first embodiment of the invention, in particular according to one or more of the embodiments described herein.

A third embodiment of the invention relates to a computer program which is configured to cause a card marking system according to the second embodiment of the invention to carry out the method according to the first embodiment of the invention, in particular according to one or more of the embodiments described herein.

The computer program may be stored on a non-volatile data carrier. Preferably, this is a data carrier in the form of an optical data carrier or a flash memory module. This may be advantageous if the computer program as such is to be traded independently of a processor platform on which the one or more programs are to be executed. In a different implementation, the computer program may be provided as a file on a data processing unit, in particular on a server, and can be downloaded via a data connection, for example the Internet, or a dedicated data connection, such as a proprietary or a local network. In addition, the computer program may comprise a plurality of interacting, individual program modules.

The card marking system may accordingly comprise a memory in which the computer program is stored. Alternatively, the card marking system may also be set up to access, via a communication link, a computer program which is available externally, for example on one or more servers or other data processing units, in particular in order to exchange data with it, which data are used during the course of the method or during the execution of the computer program or which data represent outputs of the computer program.

The features and advantages which have been explained in relation to the first embodiment of the invention similarly apply to the further embodiments of the invention as well.

Further advantages, features and possible applications of the present invention become clear from the following detailed description in connection with the figures.

BRIEF DESCRIPTION OF THE DRAWINGS

The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

In the figures, the same reference signs are used throughout for the same or mutually corresponding elements of the invention.

Figure 1:
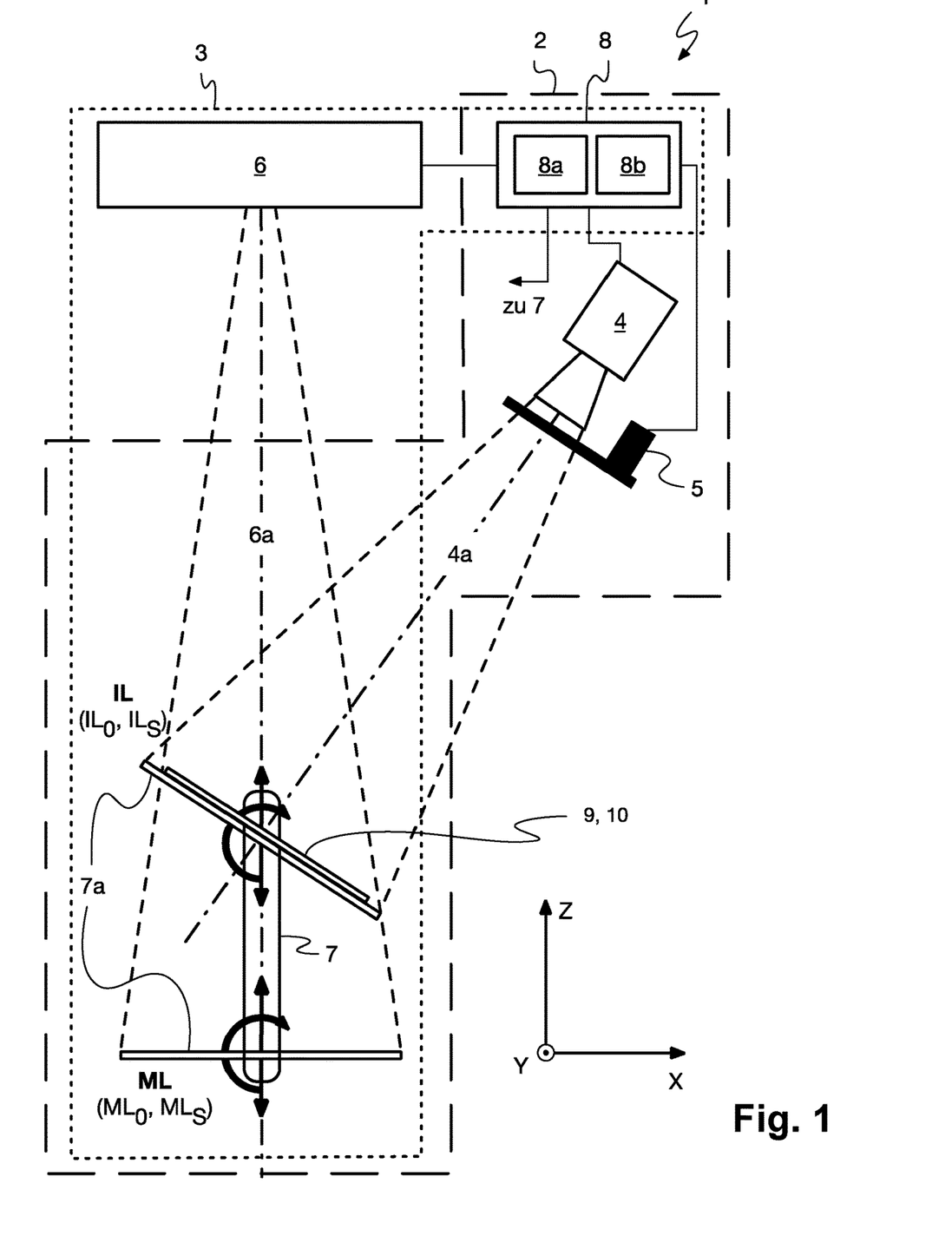
FIG. 1 is a schematic diagram showing a card marking system according to one embodiment of the invention.

The example card marking system 1 of FIG. 1 comprises a vision subsystem 2, as well as a marking subsystem 3. In particular, the vision subsystem 2 includes an image acquisition device 4 in the form of a camera, together with an aperture device (shutter device) 5 placed in front of it for adjusting a black/white balance of the image acquisition device 4. The marking subsystem 3 includes a marking device 6, which may be constructed in the form of a marking laser which is configured to cause, by its laser beam, a change in color of the surface of a plastic card 9 according to a predetermined pattern, which may contain writing, a sequence of numbers, a code pattern (e.g., a barcode, a QR code, etc.) and/or a picture element, in order to accomplish a personalization. The card 9 may, for example, be a chip card, an identity card or a membership card, which is constructed in the form of a plastic laminate, and, if applicable, with components integrated therein, such as semiconductor chips, magnetic strips or antennas for example.

Figure 4:
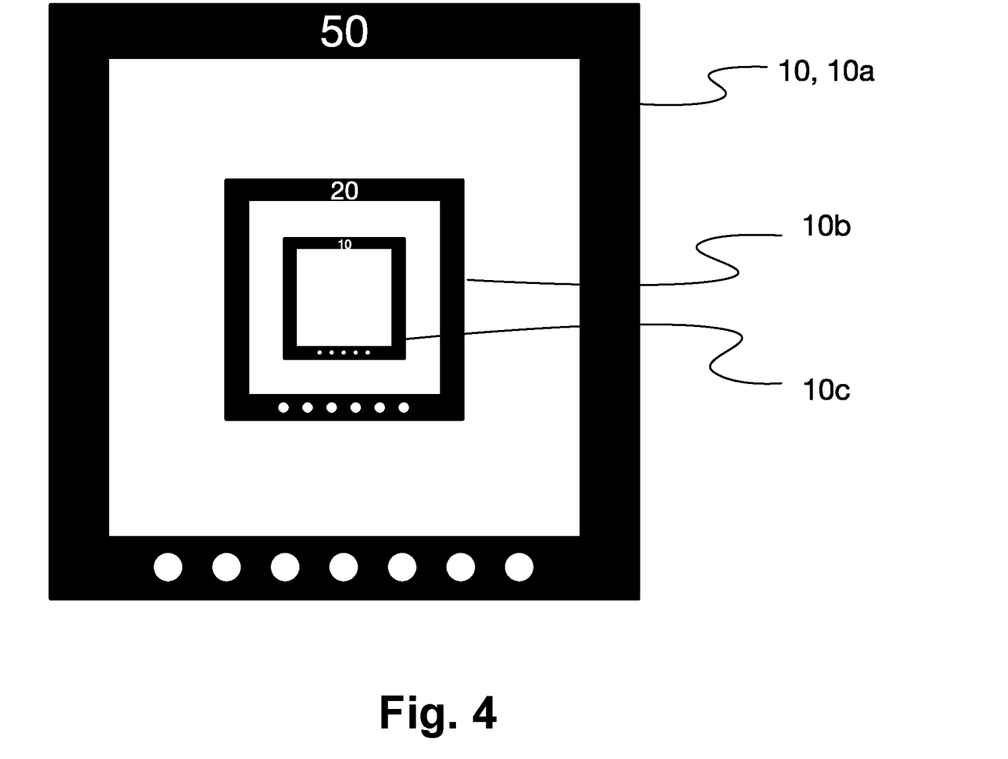
FIG. 4 is a schematic illustration showing an example layout of a reference element for use within the vision subsystem setting process of FIG. 2.

In addition, the vision subsystem 2, as well as the marking subsystem 3, comprise a control device 8, which comprises a processor platform 8a, as well as a program and data memory 8b, as well as a card lift 7, with a card holder 7a as common components, which, in a manner which is controlled (or controlled with feedback) by the control device 8, can be moved in the X, Y and Z direction (cf. coordinate system shown) and pivoted about at least one axis and thus oriented (in FIG. 1 shown, by way of example, for the Y axis, which is perpendicular to the image plane). In this context, the card holder 7a can be transferred bidirectionally by the card lift 7 between a marking pose ML, in which it is aligned with respect to an optical axis 6a of the marking device 6, and an inspection pose IL, in which it is aligned with respect to an optical axis 4a of the image acquisition device 4. The inspection pose IL (in which, in FIG. 1, the card 9 or a reference element 10 (cf. FIG. 4) is located, by way of example), as well as the marking pose ML, can each be configured, i.e., they can be set, by a corresponding parameterization of a control process by the control device 8, which, for this purpose, is connected to the components of the card marking system 1 which are controlled by it, via corresponding control and data lines, which can optionally, at least for some of the components, also be constructed as a common bus.

The control of the card marking system 1 is carried out by the control device 8, which for this purpose comprises a computer program which is stored in the memory 8b, which computer program can be executed on the processor platform 8a and which, when it is executed, controls the card marking system 1 in such a way that the latter carries out a method in accordance with the invention. In particular, the computer program can be configured in such a way that, when it is executed, it controls the card marking system 1 in such a way that the latter carries out the method which is illustrated in FIGS. 2 and 3A to 3C below, which method is in accordance with a preferred embodiment of the invention.

Figure 2:
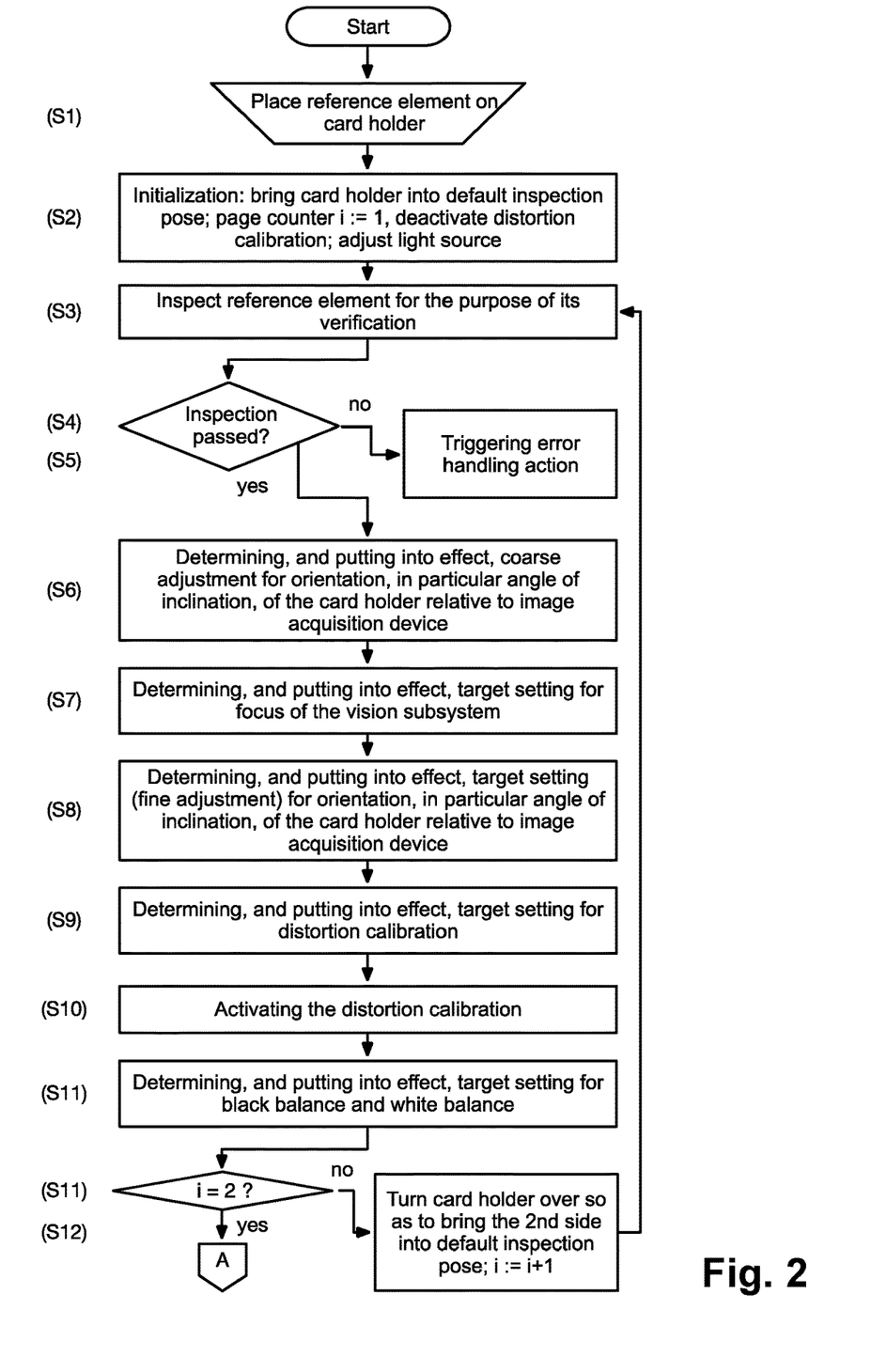
FIG. 2 is a flow chart schematically illustrating a first portion of one embodiment of the vision subsystem setting process in accordance with the invention.

FIG. 2 shows a corresponding embodiment of a vision subsystem setting process of the method, which vision subsystem setting process serves for the automated determination of an optimized target setting of the vision subsystem 2 and which is explained below with reference to the example card marking system of FIG. 1.

At the beginning of the method, in a step S1, a reference element 10 (cf. FIG. 4) is inserted, introduced or generally placed in the card holder 7a, depending on the type of the card holder 7a. In particular, this method step can be carried out either manually (as shown) by a user of the card marking system 1 or, alternatively, automatically by a corresponding feed of the reference element 10. Then, in a step S2, the vision subsystem is initialized, in particular by the card holder 7a being brought into a predetermined default inspection pose IL0, by a page counter i being set, by way of being initialized, to an initial value 1 and by a distortion calibration which is provided in the card marking system 1 and which may be implemented in particular by the computer program stored in the memory 8b, being set to a deactivated mode. The use of a page counter or, alternatively, other counters only represents one of many possible variants of implementation and is not mandatory under any circumstances but is chosen here for the purpose of a better illustration of the method. In addition, an adjustment of a light source (not shown) of the image acquisition device 4 for illuminating a card 9 and/or the reference element 10 in the inspection pose IL0 can be carried out once or several times during the process flow, in particular immediately before each inspection step, in dependence upon, for example, ambient light conditions and/or a measured brightness of the surface of the card 9 and/or the reference element 10.

In addition, in a step S3, the reference element which is located in the card holder 7a is inspected by the vision subsystem in order to verify that it is a correct and error-free reference element. If this verification fails (S4—no), a predetermined error handling action is triggered in a step S5, which may include the outputting of a corresponding error message and/or an aborting of the method. Otherwise (S4—yes), a first setting step S6 is carried out, in which an optimized, but still preliminary, setting (coarse adjustment) with respect to an orientation, in particular with respect to an angle of inclination, of the card holder 7a relative to the optical axis 4a of the image acquisition device 4 is determined and the adjustment determined is put into effect in the form of a corresponding adjustment of the card lift 7 or its card holder 7a in relation to the image acquisition device 4.

The determination of the setting for the orientation can be carried out on the basis of the known lengths of the edges of the reference element. In the case of the exemplary reference element 10 from FIG. 4, in which exemplary reference element 10, depending on the set magnification of the vision subsystem, one of the three square reference layouts 10a to 10c shown, which have different sizes, can be used, the orientation can be determined by inferring, from different, measured lengths of the edges of the image of the corresponding reference layout 10a, 10b, or 10c detected by the image acquisition device 4, the corresponding actual angles of inclination and by calculating, from this, a correction for deriving the coarse adjustment. As an alternative to this, the actual orientation of the card holder 7a can also be run through step by step, or continuously, for each axis of rotation until eventually a square representation of the corresponding reference layout appears again in the detected image as well, so that the setting which has been found in this way can be used as a coarse adjustment. The various exemplary reference layouts 10 a-c from FIG. 4, which differ from each other as regards their size, are each coded by a corresponding punch code (the number of holes indicates the size) in the lower region of the frame and/or a corresponding number in the upper region of the frame in order to make them distinguishable independently of their apparent size in an image.

Subsequently, in a further step S7, a target setting for the focus of the vision subsystem 2 is determined and put into effect. In particular, an interactive process can be used for this purpose, in which the card lift 7 is brought into various positions along the Z direction, and either one of the positions in which the detected size of the image of the reference element 10, i.e., of its corresponding reference layout 10 a-c that is under consideration, for example the dimension of its edge or its surface, comes closest to a given reference value is selected. As an alternative to this, an optimized position of the card lift 7 along the Z direction and thus a target setting for the focus can also be calculated by interpolation, extrapolation or regression, in particular linear interpolation, linear extrapolation or linear regression, from the acquired size measurement values for at least two of the positions.

This is followed by a step S8, which is similar to the previous step S6 and which now serves to determine and to put into effect a target setting for the orientation, in particular the angle of inclination, of the card holder 7a with respect to the optical axis 4a of the image acquisition device 4. With the aid of this fine adjustment, any misalignment which may have been caused by the step S7 of the coarse adjustment previously accomplished in the step S6 can be corrected in order to achieve an optimized adjustment result. The target setting for the pose of the card holder 7a which has been determined by the steps S6 to S8 defines an optimized target inspection pose ILS, which is then used during the subsequent traffic system setting process.

In a further step S9, any optical distortion of the representation of the reference element 10 which may nevertheless remain can be determined in a similar way as described above in connection with the step S6, and a distortion calibration to compensate for this remaining optical distortion can be calculated therefrom and can be determined as the target setting of a corresponding operating parameter of the vision subsystem 2. In particular, this target setting, like all other target settings determined in the course of the method, can be stored in the memory 8b for later use and/or output at an interface.

In the step S10, the distortion calibration which has been determined is then activated before, in a further step S11, a target setting for a black balance and a white balance of the image acquisition device 4 is determined and put into effect. For this purpose, the card holder 7a, together with the reference element 10, is brought into a pose which is defined by the target settings previously determined, and a white balance is first carried out with the aperture of the aperture device 5 open. The aperture is then closed in order to close the image opening of the image acquisition device 4 and thus also to interrupt the optical path between the inspection pose IL and the image acquisition device 4. This is followed by carrying out a corresponding black balance of the image acquisition device 4. The aperture is then opened again. The white balance and the black balance as such can be carried out in a usual known way, in particular in a way which is known in the field of camera technology.

In the step S11, a page counter i is used to check whether the other side of the reference element 10 or—this being equivalent—the pose of the card holder 7a in the inverted (turned over) state still needs to be subjected to the method in the same way. If this is the case (S11—no), the card holder 7a is accordingly turned over (inverted) in the step S12 so as to transfer the other main face of the reference element 10 into the default inspection pose IL0. In addition, the page counter i is incremented. Then, the method follows the branch back to the step S3 in order to cycle through the steps S3 to S11 again, but this time with respect to the other side of the reference element 10. As an alternative to this, it is also possible to design the method in such a way that, not only after its first complete run through, but already after one or more of the preceding adjustment steps, one or more steps for the corresponding treatment of the second side of the reference element 10 are carried out in the meantime.

Figure 3A:
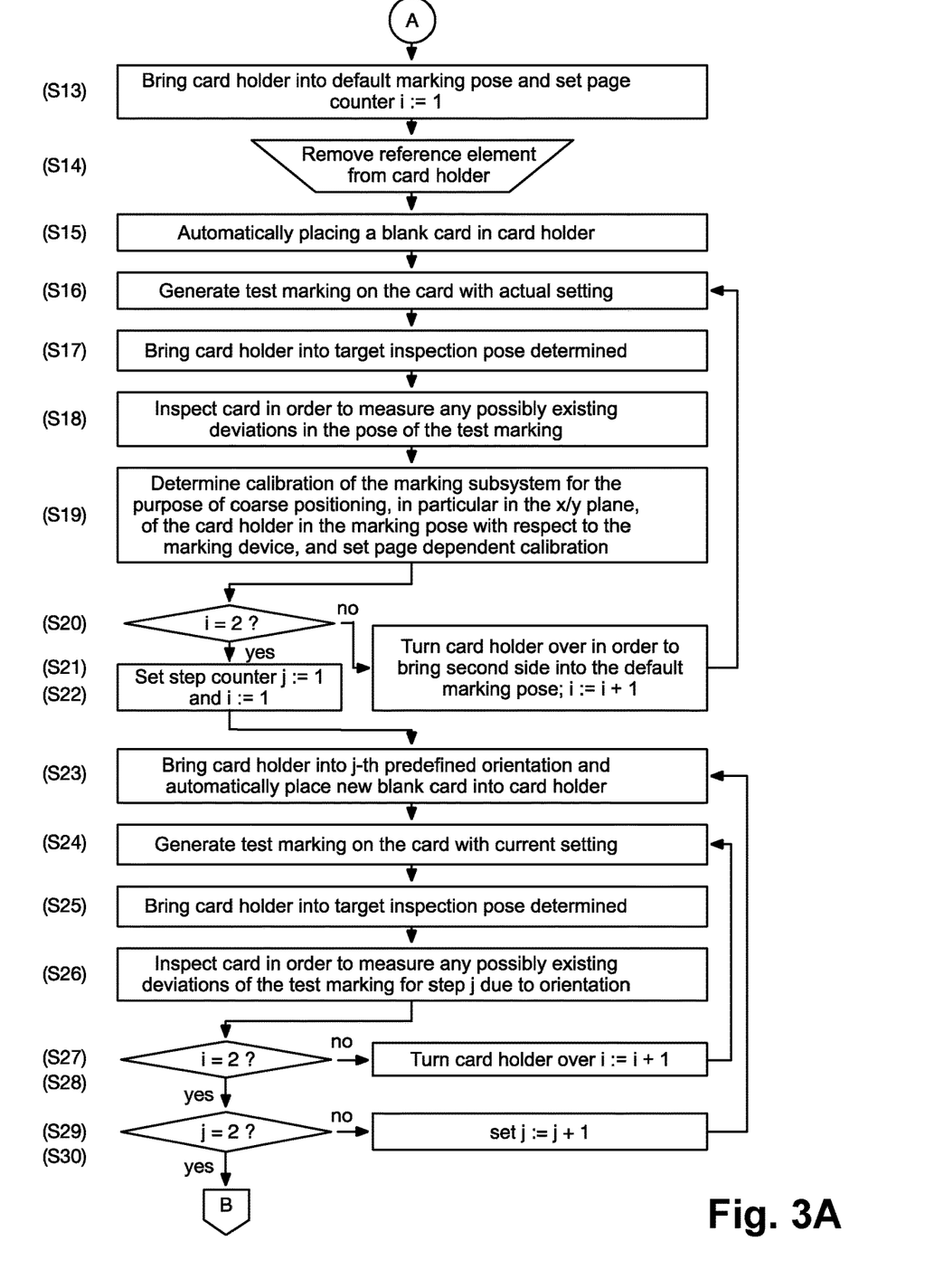
FIG. 3A is a flow chart schematically illustrating a second portion of the marking subsystem setting process of FIG. 2.
Figure 3B:
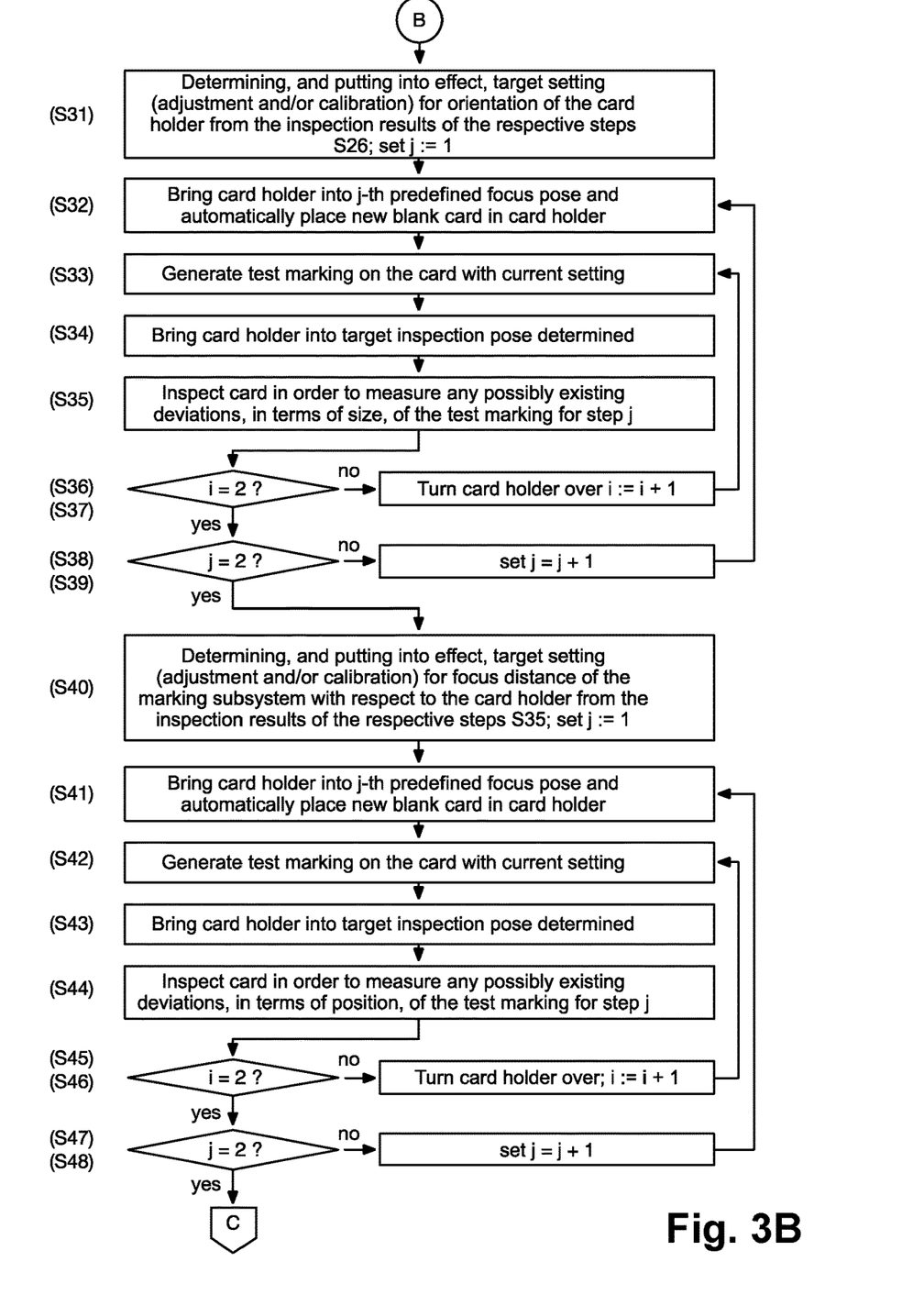
FIG. 3B is a flow chart schematically illustrating a third portion of the marking subsystem setting process of FIG. 2.
Figure 3C:
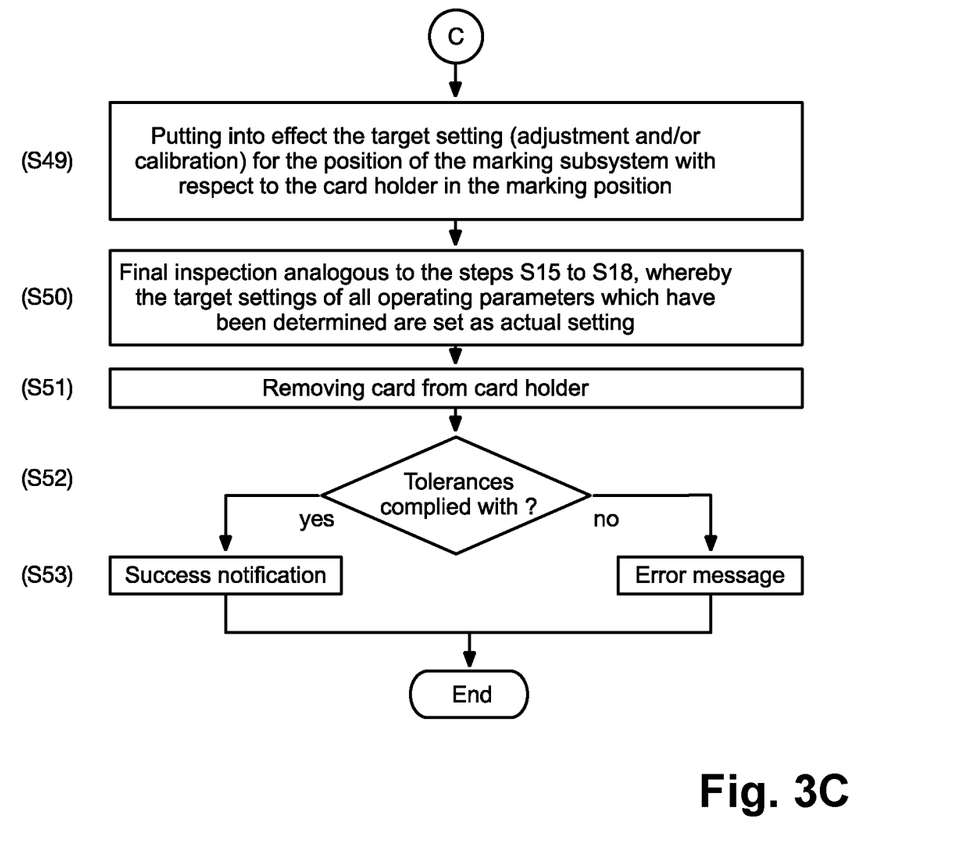
FIG. 3C is a flow chart schematically illustrating a fourth portion of the marking subsystem setting process of FIG. 2.

As illustrated by the connector A, the method then proceeds to the marking subsystem setting process, which is illustrated in the FIGS. 3A through 3C and which in the following is explained again with reference to the card marking system 1 of FIG. 1. For this, the card holder 7a is first brought into a default marking pose ML0 and the page counter i is again initialized. In the step S14, the reference element 10 is manually or, alternatively, automatically removed from the card holder 7a, and in the step S15, in its stead, a first card 9, preferably a card which does not yet have any personalization at all (blank card), is placed in the card holder 7a.

Then, in the step S16, a predetermined test marking is generated on the card 9 by the marking device 6 of the marking subsystem 3. The test marking can correspond to one of the test markings 11a or 11b respectively shown in FIGS. 5A and 5B, which are identical but which are of a different size, which, as has already been the case with the reference element 10, is indicated by a corresponding punch code (the number of holes indicates the size) in the lower region of the frame and a corresponding numerical value in the upper region of the frame. Preferably, the smaller reference layout 11b is used in the step S16, since, due to its smaller size, it is more likely to be displayed completely as a marking on the card than the larger reference layout 11a, even in the case of major misalignments.

Now, in the step S17, the card holder 7a with the card 9 is brought into the target inspection pose ILS which has been determined according to FIG. 2, and in the step S18 the card is inspected in order to measure any possibly existing deviations in the pose of the test marking formed on it, in particular with respect to the optical axis 4a of the image acquisition device 4. Then, in the step S19, on the basis of the inspection result from the step S18, a first calibration of the marking subsystem 3 is then determined and put into effect for the purpose of a coarse positioning of the card holder 7a or the card 9 in the marking pose ML, in particular in the X/Y plane with respect to the optical axis 6a of the marking device 6. In this context, the determination of a calibration can be carried out by a determination of corresponding correction values (in particular with respect to the X and Y dimensions) on the basis of the measured deviation, and the subsequent compensation, when further markings are being generated, can be carried out whilst taking into account the calibration.

Then, in the step S20, the page counter i is used to check whether the second side of the card 9 still needs to be subjected to the method, and if this is the case (S20—no), the card holder 7a, together with the card 9, is turned over in the step S21 in order now to bring the second side of the card 9 into the default marking pose ML0. In addition, the page counter i is incremented and the method follows the branch back to the step S16. Otherwise (S20—yes), a step counter j is initialized in the step S22, as well as—again—the page counter i.

Figure 5A:
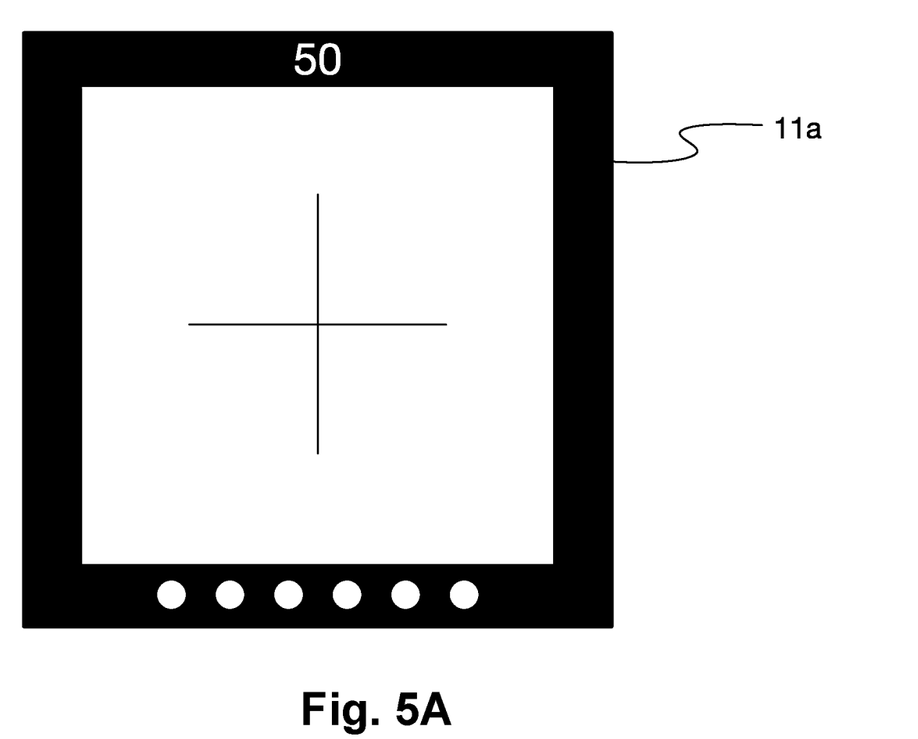
FIG. 5A is a schematic illustration of an alternative example of a reference marking that may be generated and used in the marking subsystem setting process of FIG. 2.
Figure 5B:
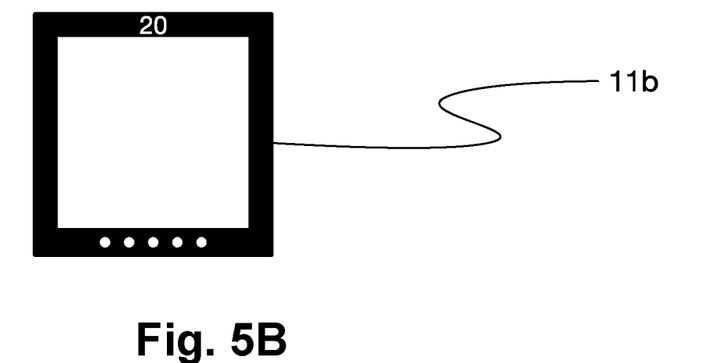
FIG. 5B is a schematic illustration of an alternative example of a reference marking that may be generated and used in the marking subsystem setting process of FIG. 2.

This is followed by a multi-stage sub-process (here, by way of example, a two-stage sub-process) comprising the steps S23 to S31 for determining an optimized orientation of the card holder 7a in the marking pose ML, for which purpose, in a step S23, the card holder 7a is first brought into a stage-specific, predefined actual orientation and a new, second card 9, preferably a blank card, is placed on the card holder 7a instead of the previous, first card. Then, in a step S24, and taking into account the calibration previously determined in the step S19, a test marking, preferably now according to the reference layout 11a of FIG. 5A, is generated on the card 9 by the marking device 6, and the card holder 7a with the card 9 is subsequently brought into the target inspection pose ILS in the step S25. There, in the step S26, it is inspected by the vision subsystem 2 so that any deviations of its pose which may exist due to its orientation, in particular relative to the optical axis 4a of the image acquisition device 4, are measured on the basis of a measurement of the test marking for the current step j.

If, in the step S27, it is recognized on the basis of the page counter i that the second side of the card 9 also still needs to be treated (S27—no), the card holder 7a, together with the card 9, is turned over again in the step S28, the page counter i is incremented, and the method follows the branch back to the step S24. Otherwise (S27—yes), in the step S29, a check is carried out on the basis of the step counter j as to whether any further stages of the sub-process still need to be completed. If this is the case (S29—no), the step counter j is incremented and the method follows the branch back to the step S23, where a third card 9, preferably again a blank card, is placed on the card holder 7a instead of the previous card in order for a corresponding measurement with a different orientation to be performed subsequently. Otherwise (S29—yes), the method follows the branch to the portion of the method shown in FIG. 3B, as is shown by the connector B, and, on the basis of the inspection results from the respective steps S26, a target setting for the orientation of the card holder 7a is determined and put into effect for the various stages, in particular as an adjustment and/or a calibration. In addition, the stage counter j is again initialized.

This is followed by a further multi-stage sub-process for determining and putting into effect an optimized target setting for the focus distance of the marking subsystem 3, which comprises the steps S32 to S40. First, in the step S32, a fourth card 9, again preferably a blank card, is placed on the card holder 7a, again instead of the previous card 9, and the card holder 7a is brought into a stage-specific predefined focus pose (along the Z direction), whereby the previously determined target settings of the other operating parameters have already been put into effect. In the step S33, a test marking which corresponds to the selected reference layout 11a is again generated on the card 9 with the current setting, then in the step S34 the card holder 7a, together with the card 9, is transferred into the target inspection pose ILS, and in the step S35 the card 9 is measured with a view to detecting any size deviations which the test marking may possibly have when compared with a target size defined by the reference layout 11a. In the subsequent step sequence S36 to S39, a second run is again triggered for the second side of the card 9, as well as a further run with a fifth card 9, again preferably a blank card, for a second stage before, in the step S40, an optimized target setting for the focus distance, at which the deviations in size are minimized or even disappear completely, is determined from the inspection results previously obtained in the respective steps S35 and put into effect, and the stage counter j is again initialized.

This is followed by a further multi-stage sub-process, comprising the steps S41 to S49, for determining and putting into effect an optimized target setting (in particular a fine adjustment) of the marking subsystem 3 with respect to the pose of the generated markings in the X/Y plane. For this purpose, in the step S41, a sixth card 9, again preferably a blank card, is first placed on the card holder 7a, again instead of the previous card 9, and the card holder 7a is brought into a marking pose ML which is defined by the previously determined target settings of the other operating parameters, in particular also for the focus distance. In the step S42, a test marking corresponding to the selected reference layout 11a is again generated, with the current setting, on the card 9, then in the step S43 the card holder 7a, together with the card 9, is transferred into the target inspection pose ILS, and in the step S44 the card 9 is measured with respect to any deviations which may possibly exist between the position of the test marking (in the X/Y plane) and a target position which is defined by the reference layout 11a, in particular its central "crosshair". In the subsequent sequence of steps S45 to S48, a second run for the second side of the card 9 as well as a further run with a seventh card 9, again preferably a blank card, are triggered for a second stage before in the subsequent step S49, which is represented in FIG. 3C (which is linked to FIG. 3B via the connector C), an optimized target setting for the position of the card holder 7a, or a corresponding calibration in which the positional deviations are minimized or even disappear completely, is determined from the inspection results which have previously been obtained in the respective steps S44 (in particular again by interpolation, extrapolation or regression).

This is followed by a further sub-process which is summarized in the step S50 and which can run analogously to the steps S15 to S18, whereby an eighth card 9, again preferably a blank card, is used instead of the previous card 9 in order to carry out a final inspection of the settings put into effect, whereby first the card marking system 1 is configured using all of the target settings which have previously been determined before the final inspection is carried out. If, on the basis of the final inspection, it is determined that all of the prescribed tolerances have been complied with (S52—yes), a message which indicates a successful run through the process is issued accordingly in the step S53. Otherwise (S52—no) an error message is issued instead.

Figure 6:
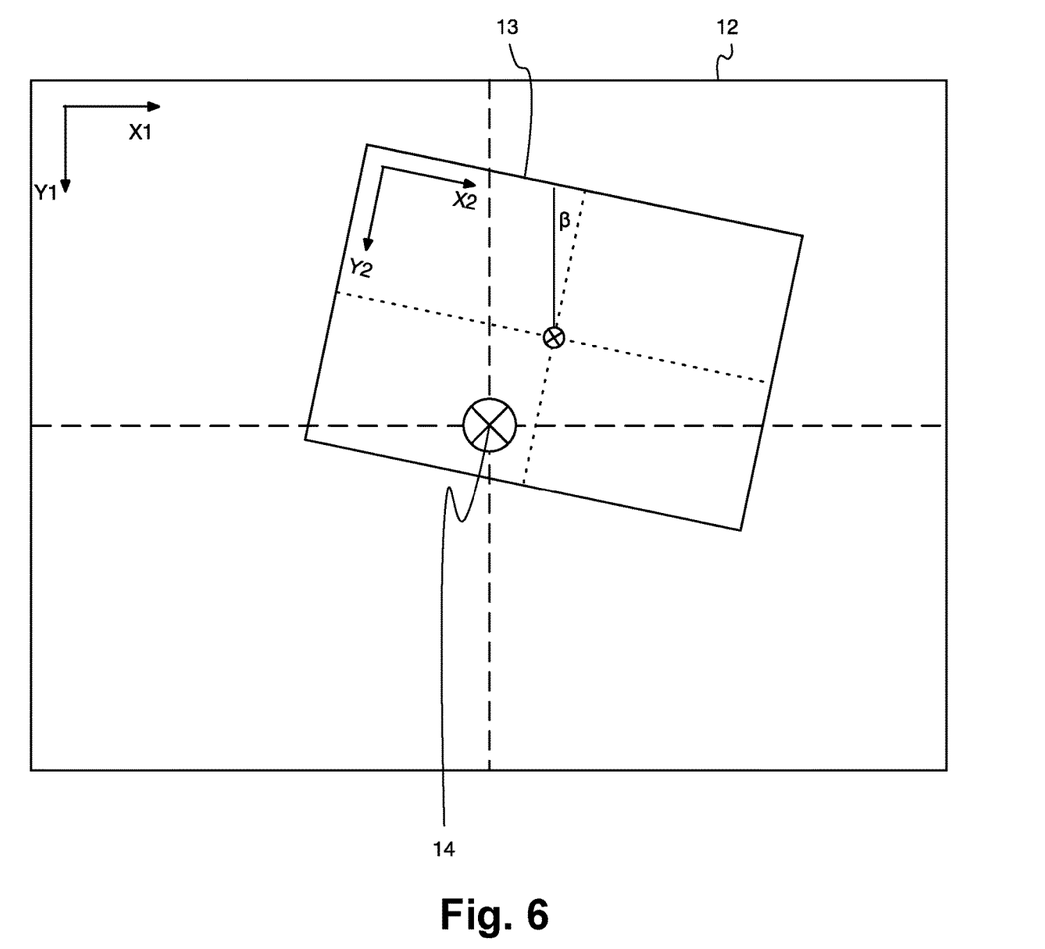
FIG. 6 is an illustration explaining a reconciliation of the coordinate systems respectively used by the vision subsystem and the marking subsystem, according to one embodiment.

FIG. 6 shows an illustration to explain an automatic reconciliation of the coordinate systems respectively used by the vision subsystem and the marking subsystem. The vision subsystem uses a first Cartesian coordinate system 12 with the coordinates X1 and Y1, whereas the marking subsystem uses a second, different Cartesian coordinate system 13 with the coordinates X2 and Y2. The origin of the vision subsystem also represents a pivot point 14 for the marking laser, about which the latter is pivotally arranged.

In the case which is shown in FIG. 6, the two coordinate systems 12 and 13 are each two-dimensional, so that a third directional component is not of any significance. In the most general case, the two coordinate systems are shifted with respect to each other so that their origins do not coincide, as well as rotated with respect to each other by an angle $\beta$. In addition, as shown, different scaling factors may be applicable with respect to the axes.

Accordingly, the reconciliation can relate to one or more of the following aspects, preferably to all of the following aspects, of the coordinate systems: the two origins, scaling factors, orientation of the axes, angles of inclination. In this way, it can be ensured that correction information, such as position corrections or orientation corrections, can be transferred from the vision subsystem to the marking subsystem without errors and can be taken into account there for putting into effect a correspondingly correct marking.

While at least one example embodiment has been described above, it is to be noted that there are a large number of variations to this. It is also to be noted that the example embodiments which have been described only represent non-limiting examples, and that it is not intended to thereby limit the scope, the applicability or the configuration of the devices and methods described here. Rather, the preceding description will provide the skilled person with instructions for the implementation of at least one example embodiment, whereby it is understood that various changes can be made, as regards the functionality and the arrangement of the elements described in an example embodiment, without deviating from the subject matter respectively defined in the appended claims, as well as its legal equivalents.

What is claimed is:

1. A method for automatically determining an optimized setting of a card marking system for personalization of plastic cards by laser marking, wherein the card marking system comprises a marking subsystem for marking a card, as well as a vision subsystem for inspecting the card, and wherein the method comprises:
(a) a vision subsystem setting process for automatically determining an optimized target setting of the vision subsystem, comprising:
inspecting a reference element by the vision subsystem and generating an inspection result, wherein the vision subsystem has a currently set actual setting; and
determining a target setting of the vision subsystem in dependence upon a comparison of the inspection result with a reference inspection criterion in such a way that the target setting defines a target setting of the vision subsystem for a subsequent operative marking mode of operation of the card marking system, which target setting of the vision subsystem, with respect to the reference inspection criterion, is optimized relative to the actual setting;
(b) a subsequent marking subsystem setting process for automatically determining an optimized target setting of the marking subsystem, comprising:
marking a card by the marking subsystem so as to form a predetermined reference marking, wherein the marking subsystem is currently set to an actual setting;
inspecting the marked card by the vision subsystem set according to its target setting which has been determined in the vision subsystem setting process so as to generate a card inspection result; and
determining a target setting of the marking subsystem in dependence upon a comparison of the card inspection result with a predetermined marking inspection criterion so that the target setting of the marking subsystem defines a target setting of the marking subsystem which, relative to the actual setting, is optimized with respect to the at least one marking inspection criterion, for a subsequent operative marking mode of operation of the card marking system; and
(c) a reconciliation process that automatically reconciles coordinate systems which are used respectively by the vision subsystem and the marking subsystem.

2. The method according to claim 1, wherein, for at least one operating parameter of the vision subsystem, which at least one operating parameter at least partly determines one or more of the following, a corresponding target setting is determined according to the vision subsystem setting process:
a spatial pose of a card holder for a card to be inspected, relative to an image acquisition device of the vision subsystem;
an optical magnification of the vision subsystem;
an optical focus of the vision subsystem;
a pose of an optical axis of the vision subsystem;
a setting of a source of radiation of the vision subsystem provided for irradiating a card during its inspection by the vision subsystem;
a distortion calibration for compensating any image distortions which may occur during the inspection of a card by the vision subsystem;
a white balance and/or black balance of the vision subsystem.

3. The method according to claim 2, wherein the determination of an optimized target setting of the at least one operating parameter of the vision subsystem is carried out without taking into account a distortion calibration to compensate for any image distortion which may occur during the inspection of a card by the vision subsystem, if the at least one operating parameter at least partly determines one or more of the following:
a spatial pose of a card holder for a card to be inspected, relative to an image acquisition device of the vision subsystem;
an optical magnification of the vision subsystem;
an optical focus of the vision subsystem;
the pose of an optical axis of the vision subsystem.

4. The method according to claim 1, wherein the card marking system comprises a card holder for receiving the reference element or a card to be marked, which card holder can be moved and/or oriented in a parameterized manner, and according to the vision subsystem setting process, for at least one operating parameter of the vision subsystem, which at least one operating parameter at least partly determines an inspection pose of the card holder relative to an image acquisition device of the vision subsystem, which inspection pose can be attained by moving and/or orienting the card holder, a corresponding target setting is determined.

5. The method according to claim 2, wherein the vision subsystem setting process comprises the following subprocesses, in order:
determining and putting into effect an optimized target setting of at least one operating parameter of the vision subsystem, which at least one operating parameter at least partly determines a spatial pose of the card holder relative to the vision subsystem;
determining and putting into effect an optimized target setting of at least one operating parameter of the vision subsystem, which at least one operating parameter at least partly determines an optical focus of the vision subsystem; and
determining and putting into effect an optimized target setting:
of at least one operating parameter of the vision subsystem which at least one operating parameter at least partly determines a distortion calibration for compensation of any image distortions which may occur during the inspection by the vision subsystem, and/or
of at least one operating parameter of the vision subsystem, which at least one operating parameter at least partly determines a white balance and/or black balance of the vision subsystem.

6. The method according to claim 5, wherein the vision subsystem setting process comprises the following subprocesses in order:
determining an optimized target setting of at least one operating parameter of the vision subsystem, which at least one operating parameter at least partly determines a spatial pose, in particular a spatial orientation, of the card holder relative to the vision subsystem;
determining an optimized target setting of at least one operating parameter of the vision subsystem, which at least one operating parameter at least partly determines an optical focus of the vision subsystem; and again determining an optimized target setting of the at least one operating parameter of the vision subsystem, which at least one operating parameter at least partly determines a spatial orientation of the card holder relative to the vision subsystem.

7. The method according to claim 1, wherein the vision subsystem setting process takes place in several stages, wherein:
in each of the stages, the at least one operating parameter is set to a different actual setting and an inspection of the reference element is carried out at this actual setting; and
the target setting of the vision subsystem is determined in dependence upon the comparison of the inspection results which are obtained in the respective stages on the basis of the at least one predetermined inspection criterion.

8. The method according to claim 1, wherein the vision subsystem setting process further comprises:
checking the reference element by the vision subsystem, on the basis of reference information, as to whether the reference element is a correct or error-free reference element according to the reference information; and
triggering a predetermined error handling action if the reference element is not a correct or error-free reference element according to the result of the check.

9. The method according to claim 1, wherein, for at least one operating parameter of the marking subsystem, which at least one operating parameter at least partly determines one or more of the following, a corresponding target setting is determined according to the marking subsystem setting process:
a spatial pose of a card holder for a card to be marked, relative to a marking device of the marking subsystem;
an optical magnification of the marking subsystem;
an optical focus distance of the marking subsystem;
a pose of an optical axis of the marking subsystem;
a pose calibration to compensate for any possible incorrect adjustment of the marking subsystem.

10. The method according to claim 1, wherein the card marking system comprises a card holder which can be moved and/or oriented in a parameterized manner, and, according to the marking subsystem setting process, for at least one operating parameter of the marking subsystem, which at least one operating parameter at least partly determines a marking pose of the card holder relative to a marking device of the marking subsystem, which marking pose can be attained by moving and/or orienting the card holder, a corresponding target setting is determined.

11. The method according to claim 9, wherein the marking subsystem setting process comprises the following subprocesses in order:
determining and putting into effect an optimized target setting of at least one operating parameter of the vision subsystem, which at least one operating parameter at least partly determines a spatial pose of the card holder relative to a marking device of the marking subsystem or a corresponding pose calibration or a combination of both;
determining and putting into effect an optimized target setting of at least one operating parameter of the marking subsystem, which at least one operating parameter at least partly determines a focus distance of the marking subsystem; and
again determining and putting into effect an optimized target setting of the at least one operating parameter of the vision subsystem, which at least one operating parameter at least partly determines a spatial orientation of the card holder relative to the marking subsystem, or a corresponding pose calibration or a combination of both.

12. The method according to claim 1, wherein the marking subsystem setting process takes place in several stages, wherein:
in each of the stages:
the at least one operating parameter is set to a different actual setting,
a card is marked at this actual setting by the marking subsystem so as to form a predetermined reference marking, and
the marked card is inspected by the vision subsystem, which has been set according to its target setting which has been determined in the vision subsystem setting process; and
the target setting of the vision subsystem is determined in dependence upon the comparison of the inspection results which are obtained in the respective stages on the basis of the at least one predetermined marking inspection criterion.

13. The method according to claim 9, wherein, for at least one operating parameter of the marking subsystem, which at least one operating parameter at least partly determines an optical focus distance of the marking subsystem, a corresponding target setting is determined, according to the marking subsystem setting process, with a view to being able to achieve, with this target setting, a minimization of a deviation of a predetermined geometric property of the reference marking from a reference quantity characterized by the marking inspection criterion.

14. The method according to claim 1, wherein the vision subsystem setting process, the marking subsystem setting process, or both, is or are carried out both in relation to a front face and in relation to a rear face of the reference element or, respectively, of the card to be marked.

15. The method according to claim 14, wherein the reference element or the card is rotated by the card marking system between an inspection of a front face thereof and an inspection of a rear face thereof, within a framework of the determination of an optimized setting of the at least one operating parameter, in order to make the rear face accessible as well, for inspection by the same vision subsystem, after the front face, or vice versa.

16. The method according to claim 1, wherein target settings of operating parameters of the vision subsystem and/or of the marking subsystem which have been determined by the method are stored or output, at least partly, for reuse for a later readjustment of the card marking system or as configuration data for a corresponding data-based configuring of a further card marking system.

17. A card marking system for personalization of plastic cards by laser marking, wherein the card marking system comprises a marking subsystem for marking a card, as well as a vision subsystem for inspecting the card, and wherein it is arranged to carry out the method according to claim 1.

18. A computer program stored on a non-transitory computer-readable medium, which is configured to cause the card marking system according to claim 17 to carry out the method according to claim 1.

* * * * *